United States Patent Office 3,350,423
Patented Oct. 31, 1967

3,350,423
METHOD OF PREPARING ETHERS OF THIOBISPHENOL COMPOUNDS
Robert L. Carlyle, Lake Jackson, Tex., assignor to The Dow Chemical Company, Midland, Mich., a corporation of Delaware
No Drawing. Filed June 29, 1966, Ser. No. 561,413
4 Claims. (Cl. 260—348.6)

ABSTRACT OF THE DISCLOSURE

Glycidyl ethers of thiobisphenol compounds are prepared by putting an epihalohydrin and a phenol or substituted phenol in a suitable reaction vessel in amounts sufficient to provide at least two oxirane groups per hydroxyl group and admixing therewith a sulfur chloride at a temperature range of between about $-15°$ C. and $50°$ C. and thereafter admixing therewith an aqueous solution of an alkali metal hydroxide to provide a molar excess thereof over the aryl hydroxy compound originally present at a temperature of between about $100°$ and about $140°$ C. to yield said glycidyl ethers and thereafter separating the glycidyl ethers from the reaction mixture.

---

This is a continuation-in-part of U. S. patent application Ser. No. 155,830, filed Nov. 29, 1961, now abandoned.

The invention relates to a novel and improved method of preparing diglycidyl ethers of thiobisphenols.

The product prepared by reacting an epihalohydrin with a polyhydric phenol in an aqueous alkaline medium to produce diglycidyl ether resins, commonly known as epoxy resins, is well known. Although the known epoxy resins have highly desirable properties which make them particularly suitable for a large number of specific uses, they are lacking in some desirable properties. For example, a lower viscosity than that possessed by known epoxy resins customarily used would facilitate the compounding thereof. It is also desirable that, for certain purposes, epoxy resins cure more rapidly (that is harden into a thermoset resin) than is usually the case.

There has recently been discovered a diglycidyl ether of thiobisphenol which has a lower viscosity than that normally exhibited by known epoxy resins and has an accelerated curing rate. The generic formula of such diglycidyl ether is:

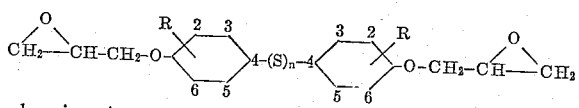

wherein $n$ is an integer selected from 1, 2, and 3, wherein the point of attachment of the sulfur atom to each benzene nucleus is a carbon atom located in a position numbered 2, 4, and 6, wherein an R substituent is attached to each carbon atom located in positions 3 and 5 and to those in positions 2, 4, and 6 which are not attached to a sulfur atom, and wherein the R substituents are selected from the group consisting of hydrogen, alkyl, aryl, halogen, alkoxy, and hydroxyl. The composition so made may be subsequently admixed with a suitable hardening agent, e.g., a primary, secondary, or tertiary aliphatic or aromatic amine or polyamine, a dicarboxylic acid anhydride, or a Lewis acid or an organic complex thereof such as $BF_3$:triethylamine.

The composition of the invention is useful for making castings, protective coatings, caulkings and patching material, laminates, sealants, molds and patterns, plastic foams, and compositions adapted to potting, embedding, impregnating, and encapsulating.

The diglycidyl ethers of thiobisphenol compounds have heretofore been prepared by a two-stage process. The first stage broadly consists of reacting a sulfur chloride with about twice the molar quantity of an aryl monohydroxy compound, e.g., phenol or a substituted phenol in an organic solvent in an inert gas atmosphere while being agitated to form a thiobisphenol as a crystalline solid. By the term thiobisphenol is meant a binuclear-polyhydroxy sulfide having the formula

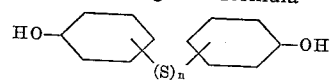

including alkyl, aryl, alkaryl, halogen, alkoxy and hydroxyl ring-substituted derivatives thereof wherein substitution is at the 3 and 5 positions and the 2, 4, and 6 positions, that are not attached to a sulfur atom, of the benzene nuclei. Crystalline thiobisphenols are thus made and subsequently separated from the liquid reactants, usually as a precipitate by filtration. The precipitate thus recovered is then washed several times with a suitable organic solvent and dried.

The second stage consists essentially of reacting the crystalline thiobisphenol produced in the first stage with a molar excess of an epihalohydrin in the presence of an alkali metal hydroxide which is slowly added thereto until a slight molar excess thereof has been provided. The diglycidyl ether of thiobisphenol, usually an equilibrium mixture of the mono- and dithiobisphenol ethers. Some trithiobisphenol is thought to form, but due to its instability is converted to the mono- and di-ethers. The product thus made is subsequently separated by known procedures.

The present invention is an improvement over the above described two-stage method. It eliminates the necessity of recovering and purifying an intermediate product, the thiobisphenols.

The invention is predicated on the discovery that a dithiobisphenol forms when a sulfur chloride is admixed with a mixture of an aryl hydroxy compound, e.g., phenol or substituted phenol and an epihalohydrin. The addition of an alkali metal hydroxide to the dithiobisphenol-epichlorohydrin mixture results in the formation of the desired diglycidyl ethers of the thiobisphenol. This discovery obviates the need for separating the thiobisphenol as a crystalline product prior to reaction with an epihalohydrin. The discovery that a sulfur chloride selectively reacts with a phenol or substituted derivative thereof in the presence of an epihalohydrin and that any reaction of the sulfur chloride with the epihalohydrin present is insufficient to be detectable was unexpected. One possible explanation for this phenomenon is that the epihalohydrin serves as an absorber of the HCl produced as a by-product in the reaction between the phenol and the sulfur chloride.

The method of the invention is carried out by putting the epihalohydrin and phenol or substituted phenol in a suitable reaction vessel provided with stirrer, temperature control means, and an inert gas supply means. The epihalohydrin is employed in an amount sufficient to provide at least two, and preferably from 4-6, oxirane groups per hydroxyl group. Sulfur chloride, viz., $SCl_2$, $S_2Cl_2$, or mixtures thereof, is then added slowly thereto, accompanied by stirring and a flow of inert gas, and the temperature maintained between $-15°$ C. and $50°$ C.

An aqueous solution of an alkali metal hydroxide is then added slowly to the reaction mixture of $100°$ C. to $140°$ C. until at least two moles of alkali metal hydroxide per mole of phenol originally present has been added.

The phenol or substituted phenol, hereinafter usually referred to as the aryl hydroxy compound, and the sulfur chloride are preferably employed in stoichiometric amounts, i.e., about 0.5 mole of the sulfur chloride per mole of the aryl hydroxy compound. However, a molar ratio of between about 0.4 and about 0.6 of the sulfur chloride per mole of the aryl hydroxy compound may be employed. The reaction temperature in the practice of the invention may be between about −15° and about 50° C., the preferable range being about −5° and about 20° C. When the temperature increases appreciably above 50° C., there is a tendency to produce some phenyl glycidyl ether. On the other hand, when the temperature is appreciably below −15° C., the rate of reaction is undesirably slow and the sulfur chloride reactant tends to accumulate in the reaction mixture. When the reactants are present in the desirable amount above indicated, the reaction is rapid but readily controllable. However, when the sulfur chloride is employed in an amount substantially greater than the stoichiometric quantity, thereby providing an excess of sulfur chloride, exothermic heat produced raises the temperature to an undesirably high value and the quality of the product may be impaired as a result thereof, as is sometimes evidenced by its being black and viscous rather than a brown or amber-colored liquid of relatively low viscosity.

Suitable aryl hydroxy compounds that may be employed in the process of this invention are those selected from, but not limited to, the group comprising, phenol, p-chlorophenol, o-chlorophenol, m-chlorophenol, p-bromophenol, o-bromophenol, m-bromophenol, m-cresol, o-cresol, p-cresol, o-ethylphenol, p-ethylphenol, m-ethylphenol, o-propylphenol, m-propylphenol, p-propylphenol, o-isopropylphenol, m-isopropylphenol, p-isopropylphenol, o-butylphenol, p-butylphenol, m-butylphenol, o-tertiary-butylphenol, p-tertiary-butylphenol, m-tertiary-butylphenol, o-phenylphenol, p-phenylphenol, and m-phenylphenol.

The procedure employed in the practice of the invention, as above broadly described, will be made more clear by the following examples. It is to be borne in mind, however, that the examples are illustrative only and are not to be construed as limitations of the practice of the invention.

Example 1

A reaction vessel, provided with a vent for the evolution of gases, a temperature recording and control means, and an agitator, was charged as follows: 40 gram moles of epichlorohydrin and 8 gram moles of phenol were placed therein, accompanied by stirring, and the vessel put in a nitrogen gas atmosphere and heated to 50° C. There were then slowly added to the contents of the vessel 4.2 gram moles of $S_2Cl_2$ accompanied by agitation. The resulting mixture was then heated to 120° C. and 20 gram moles of NaOH, as a 50% aqueous solution, slowly admixed therewith. A vacuum was applied and excess epichlorohydrin removed. A volume of toluene, substantially equal to the volume of epichlorohydrin removed, was added and the resulting mixture heated, with stirring, thereby causing the by-product NaCl, formed during the reaction period, to precipitate. The precipitate was separated by filtration and the filtrate thus obtained washed with water three times to remove any adhering NaCl. The toluene was thereafter volatilized off by distillation at a pressure reduced to about 2 or 3 millimeters of mercury and at a temperature of about 120° C. A brown liquid was thus procured. It was evaluated and found to have an epoxy equivalent weight of 205 and to contain 22.2% oxirane groups, by weight. It had a viscosity, at 25° C., of 2380 cps. By analysis it was found to be substantially a 50–50% by weight mixture of the diglycidyl ether of 4,4'-monothiobisphenol and the diglycidyl ether of 4,4'-dithiobisphenol.

Example 2

A reaction vessel, provided with a vent for the evolution of gases, a temperature recording and control means, and an agitator, was charged as follows: 20 gram moles of epichlorohydrin and 4 gram moles of phenol were placed therein, accompanied by stirring, and the vessel cooled to between 0° C. and 10° C. There were then slowly added 2 gram moles of $SCl_2$ over a period of 3 hours and a 2000 ml. solution resulted. A 1000 ml. portion of this solution was heated to 112° C. and 4.08 moles of NaOH, as a 50% solution, was slowly added. The excess epichlorohydrin was removed with vacuum and a mixture comprising 3½ parts toluene and ½ part of hexane, by volume, was added until a specific gravity of .92 resulted. The salt was removed by filtration and the product water-washed 4 times. The solvent was then removed by distillation at 110° C. and .5 mm. $H_2$ pressure. The resultant resin was found to contain 24% epoxide groups.

Example 3

The procedure of Example 1 was repeated except that p-tertiary-butylphenol was employed instead of phenol. The end product formed was found to be substantially a 50–50% by weight mixture of the diglycidyl ethers of mono- and di-2,2'-thiobis-(4-tertiary-butylphenol). It was evaluated and found to contain 13.6% oxirane groups which was 13.6/18.14 or about 75% by weight of that theoretically possible.

Example 4

The procedure of Example 1 was again repeated except that p-chlorophenol was employed instead of phenol. The end product formed was found to be substantially a 50–50% by weight mixture of the diglycidyl ethers of mono-and di-2,2'-thiobis-(4,4'-chlorophenol) and to contain 11.5% oxirane groups by weight which was 11.5/20.0 or 57% of that theoretically possible. The resin thus made is self-extinguishing, that is, it does not burn after an igniting source is removed from contact therewith.

Example 5

A reaction vessel, provided with a vent for the evolution of gases, a temperature recording and control means, and an agitator, was charged as follows: 92 grams (1 mole) of epichlorohydrin and 34 grams (0.2 mole) of o-phenyl phenol were placed therein accompanied by stirring, and the vessel cooled to −5° C. There were then slowly added 13.4 grams (0.1 mole) of $S_2Cl_2$. The reaction mass was allowed to rise to room temperature, then heated to reflux temperature (about 117° C.) while 32 grams of 50% aqueous sodium hydroxide was slowly added. The excess epichlorohydrin was removed under vacuum and 100 ml. of toluene was added and the salt removed by filtration. The filtrate was washed with two 25 ml. portions of salt water and the organic layer separated. After filtering, the toluene was removed by vacuum flashing. The product had an epoxide equivalent weight of 387. The theoretical epoxide equivalent weight for this product was 341.

Example 6

The procedure of Example 5 was repeated except that p-bromo phenol was employed instead of o-phenyl phenol. The resultant product had an epoxide equivalent weight of 254. The theoretical epoxide equivalent weight for this product was 259.

To ascertain the gel time of the resins of the invention, a series of tests was run on the mono- and the di-4,4'-thiobisphenol ethers made in Example 1 above. For purposes of comparison, test were also run on the rate of gelation of a well-known epoxy resin having an epoxide equivalent weight of betwen 187 and 193 known as D.E.R. 331. Gel time is a reliable test employed to indicate the rate cure of epoxy resins. It may be defined as the period of time which elapses between the time of admixture of a curing agent with an epoxy resin and the time in which the resulting mixture is no longer fluid as determined by a standard gelometer.

Example 7

This example consisted of admixing 10 parts by weight diethylenetriamine with 100 parts by weight of the resin of Example 1 and allowing it to stand until it had gelled in accordance with the above described test. The gel time was 37 minutes at room temperature.

Example 8

Example 7 was repeated except that Versamid 140, prepared by reacting a linoleic dimeric acid and diethylene triamine, was employed as the curing agent in an amount of 57 parts thereof per 100 parts of the resin. The gel time was 34 minutes at 50° C.

For comparative purposes the D.E.R. 331 resin, above described, was admixed with diethylenetriamine in the same ratio as employed in Example 7. It was found that the gel time was substantially 83 minutes at room temperature, which is about twice the gel period of the resin of the invention. Similarly D.E.R. 331 was admixed with the Versamid 140 in the amount employed above and the gel time observed at about 50° C. and was also observed to be substantially twice the gel time of the resin of the invention cured with the same Versamid above.

Example 9

A sample of the resin of the invention of Example 7 above which was cured with diethylenetriamine and a sample of the conventional D.E.R. 331 resin cured with diethylenetriamine above were subjected to standard tests to determine the more significant physical properties thereof. The physical properties thus determined are set forth below:

| Physical Properties | Cured Resin of the invention prepared according to Example 7 | Cured D.E.R. 331 Resin |
| --- | --- | --- |
| Tensile Strength, p.s.i. | 11,400 | 12,000 |
| Elongation at Break, Percent | 13 | 10 |
| Izod Impact, in Ft. Lbs. | 0.3 | 0.5 |
| Rockwell Hardness No. | 110 | 100 |
| Compressive Strength, p.s.i. | 16,700 | 16,000 |
| Heat Distortion in ° F. | 160 | 210 |

Reference to the table shows that the resin of the invention, when cured by admixing an amine type curing agent therewith and heating, results in a composition having good physical properties among which are high tensile strength, compressive strength, and heat distortion values without sacrifice of toughness as measured by the percent elongation at break. Further reference to the table shows that the physical property values obtained by the tests are substantially the same for the resin of the invention and the conventional diglycidyl bisphenol type epoxy resin. The only measurable differences were that of the heat distortion temperature and Izod Impact which appear to be somewhat higher for the cured D.E.R. 331 epoxy resin. Such differences are unimportant except under a limited number of conditions.

The epoxy resin of the invention has the pronounced advantage, however, over known epoxy resins in having a lower viscosity during compounding and providing a faster cure with comparable amounts of the same curing agents as are employed to cure epoxy resins. It had no disadvantages, either in the conditions required for the curing thereof or in the physical properties of the cured resin. Its quick cure makes it particularly desirable for such uses as impregnating and laminating fabrics.

It is also a significance that the resin of the invention may be made by employing a halogenating phenol to yield a halogenated thiobisphenol diglycidyl ether, as illustrated by Examples 4 and 6. Such epoxides are self-extinguishing as determined by A.S.T.M. Test D635–56T. A resin is designated self-extinguishing in accordance with this test when it does not support burning after removal of an igniting source from contact therewith, i.e. it extinguishes itself.

The particular advantage of the invention is the economical and highly efficient process for the manufacture of the diglycidyl ethers of dithiobisphenols. By the practice of the invention, it is unnecessary to remove the dithiobisphenols after they are formed by an individual step as has heretofore been found necessary.

According to the invention, the phenol or substituted phenol, as hereinbefore described, and the epichlorohydrin may be admixed together in a suitable reaction vessel and the sulphur chloride slowly added thereto. Thereafter an alkali metal hydroxide is added slowly to produce the desirable diglycidyl ether of the thiobisphenol which is subsequently separated from the reaction mixture by known means. The ether thus obtained is stable and readily converted to the thermoset resin, above described, having extensive utility.

Having described my invention, what is claimed and desired to be protected by Letters Patent is:

1. The method of preparing diglycidyl ethers of thiobisphenol which are represented by the formula:

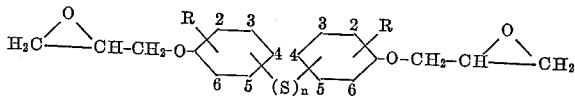

wherein $n$ is an integer having a value of from 1 to 3, wherein the point of attachment of the sulfur atom to each benzene nucleus is a carbon atom located in positions selected from the group numbered 2, 4 and 6, wherein R is a substituent selected from the group consisting of hydrogen, alkyl, phenyl, and halogen, and wherein an R substituent is attached to each carbon atom located in positions 3 and 5 and in positions 2, 4 and 6, which are not attached to a S atom, said method consisting essentially of slowly adding, while maintaining the temperature at between about $-15°$ C. and $50°$ C., a sulfur chloride selected from the class consisting of $SCl_2$, $S_2Cl_2$ and mixtures thereof to a mixture comprising an epihalohydrin and an aryl hydroxy compound selected from the class consisting of phenol, alkyl-substituted phenols, halo-substituted phenols, phenyl-substituted phenols, and mixtures thereof, the amount of epihalohydrin being at least 2 moles per mole of aryl hydroxy compound and the amount of the sulfur chloride being from about 0.4 to about 0.6 mole per mole of aryl hydroxy compound and adding slowly thereto an aqueous solution of an alkali metal hydroxide until at least two moles thereof per mole of aryl hydroxy compound originally present has been added, while maintaining the temperature of the resulting mixture at between about $100°$ C. and about $140°$ C., accompanied by stirring until the reaction, yielding said diglycidyl ethers of thiobisphenol, is substantially complete, admixing therewith an inert solvent, removing the by-product salt formed in the reaction, volatilizing off the inert solvent, and recovering the resulting diglycidyl ethers of thiobisphenol.

2. The method according to claim 1 wherein the sulfur chloride employed is substantially $S_2Cl_2$.

3. The method according to claim 1 wherein the sulfur chloride employed is substantially $SCl_2$.

4. The method according to claim 1 wherein the aryl hydroxy compound employed is a halogenated phenol.

References Cited

UNITED STATES PATENTS

| | | | |
| --- | --- | --- | --- |
| 3,078,271 | 2/1963 | De Groote | 260—348 |
| 2,985,617 | 5/1961 | Salyer et al. | 260—348 |
| 2,839,489 | 6/1958 | De Groote et al. | 260—348 |

WALTER A. MODANCE, *Primary Examiner.*

N. S. MILESTONE, *Assistant Examiner.*